United States Patent Office 3,509,205
Patented Apr. 28, 1970

3,509,205
TRANSESTERIFICATION OF MYRCENE HYDROCHLORIDE
Theodor Leidig, Holzminden, Germany, assignor to Haarmann & Reimer G.m.b.H., Holzminden, Germany, a corporation of Germany
No Drawing. Filed Aug. 30, 1967, Ser. No. 664,299
Claims priority, application Germany, Sept. 3, 1966, H 60,408
Int. Cl. C07c 69/14, 67/02, 33/02
U.S. Cl. 260—489                                10 Claims

ABSTRACT OF THE DISCLOSURE

Transesterification of myrcene hydrochloride with at least an equimolar, and preferably a slight excess, amount of sodium acetate in a tertiary alcohol as solvent, e.g. having 4–6 carbon atoms, optionally containing up to about 30% water, at an elevated temperature, e.g. substantially between about 90–100° C. and/or at the boiling temperature of the solvent, optionally in the presence of an alkaline compound, e.g. an alkaline earth metal carbonate such as calcium carbonate or magnesium carbonate, and optionally in the presence of a catalyst, e.g. cuprous or cupric salts, to produce ester mixtures of which up to 95% or more consist of linalyl acetate leading correspondingly to linalool upon hydrolysis.

---

This invention relates to the transesterification of myrcene hydrochloride, the addition product of equimolar quantities of HCl and myrcene, or its solvolysis, which is accompanied by the formation of mixtures containing fluctuating amounts of terpene alcohols or their esters. These mixtures consist essentially of the following alcohols or their esters: geraniol, nerol, terpineol, linalool and myrcenol.

Several attempts have been made to change the qualitative composition of these mixtures, for example, by hydrolysis with $CaCO_3$, in which case equal parts of linalool and terpineol are formed, or by using a tertiary amine as the transesterification catalyst with sodium acetate, in which case geranyl acetate and neryl acetate are mainly formed, or by transesterification in glacial acetic acid with relatively large quantities of cuprous chloride as a catalyst, in which case from 75% to 80% of the ester mixture consists of linalyl acetate.

We have now found that linalyl acetate can be obtained in high yields by the transesterification of myrcene hydrochloride with sodium acetate provided the reaction is carried out in a tertiary alcohol, avoiding the use of an acid medium. The myrcene hydrochloride is reacted with substantially equimolar quantities of sodium acetate or the latter is preferably used in a slight excess. To accelerate the reaction, it is advantageously carried out at an elevated temperature, for example, at the boiling temperature of the solvent or, in the case of relatively high-boiling alcohols, at from 90° C. to 100° C. for example. Instead of the pure tertiary alcohols, it is also possible to use aqueous alcohols with a water content of, for example, up to 30%. Examples of tertiary alcohols include tert.-butanol and diethylmethyl carbinol. Preferably, there are used tertiary alcohols with from 4 to 6 carbon atoms. To avoid the formation of an acid reaction medium, it is of advantage to add alkaline compounds such as, for example, alkaline earth carbonates, e.g. calcium carbonate or magnesium carbonate. In order to increase the velocity of the reaction, it is preferred to work in the presence of catalysts such as for example, cuprous or cupric salts.

The process according to the invention provides ester mixtures of which 95% and more consist of linalyl acetate.

Example 1

2 mols (272 g.) of myrcene hydrochloride are added with stirring to a mixture, boiling under reflux, of 2.4 mols (200 g.) of anhydrous sodium acetate, 1 g. of cupric sulphate, 0.55 mol (55 g.) of whiting ($CaCO_3$) and 500 g. of tert. butanol (90%, 10% water).

The reaction mixture is boiled for 10 hours and may then be worked up in different ways:

(a) By evaporating off the tert. butanol up to an internal temperature of at the most 110° C., adding water and acetic acid to dissolve the calcium carbonate and separating the oil layer, or, better.

(b) By carefully filtering the precipitate under suction, followed by washing with tert. butanol, which may then be directly reused for the next batch, and evaporating off the solvent at an internal temperature of up to 110° C., adding water, separating the oil layer and washing it to neutral.

The oil layer is distilled in vacuo and, at $BP_{10\ mm}$: 75° C.–130° C., gives 367 g. of crude ester product containing 1% of Cl and 71% of ester, corresponding to a total yield of 66.4% esters based on the starting material. Analysis by gas chromatography shows that, in addition to hydrocarbons, the hydrolysed ester only contains linalool (95%) with at the most 5% of other carbinols (geraniol, nerol). Of the 500 g. of 90% tert.-butanol used, it was possible to recover 450 g. with a water content of 6.3%.

Example 2

2 mols (272 g.) of myrcene hydrochloride are added with stirring to a mixture, kept at 90° C., of 2.4 mols (200 g.) of sodium acetate (anhydrous), 1 g. of cupric sulphate, 0.5 mol (20 g.) of MgO and 200 g. of diethylmethyl carbinol. The reaction mixture is stirred for 10 hours, allowed to cool, and washed with water and acetic acid to remove the excess magnesium oxide, and the oil layer is separated off.

The oil layer is distilled in vacuo and, at $BP_{150\ mm}$: 80° C., gives from 150 to 180 g. of diethylmethyl carbinol and then, at $BP_{10\ mm}$: 75–130° C., 315 g. of crude ester product containing 1% of Cl and 65% of ester, corresponding to a total yield of 52% esters based on the starting material.

Analysis by gas chromatography shows that, in addition to hydrocarbons, the hydrolysed ester only contains linalool (95%) with at the most 5% of other carbinols (geraniol, nerol).

Thus, in accordance with the present invention, a versatile and smooth process is provided for the transesterification of myrcene hydrochloride to produce linalyl acetate almost exclusively and in high yields up to about 95% and more, which comprises reacting myrcene hydrochloride with at least an equimolar amount of sodium acetate in a tertiary alcohol solvent at an elevated temperature and recovering the linalyl acetate from the resulting reaction mixture.

The reaction is conveniently carried out at an alkaline pH, e.g. 8–12, to avoid the formation of an acid reaction medium. For this purpose, an alkaline earth metal carbonate such as $CaCO_3$, $MgCO_3$, etc., is used, for example in an amount substantially between about 0.25–1 mol per mol of myrcene hydrochloride.

To accelerate the reaction, a copper catalyst may be used advantageously, such as cuprous and cupric sulfate, chloride, bromide, iodide, fluoride, nitrate, phosphate, acetate, propionate, butyrate, etc., for example in an amount substantially between about 0.31–1 gram per mol of myrcene hydrochloride.

Equimolar amounts of myrcene hydrochloride and sodium acetate may be used or a slight molar excess of sodium acetate up to about 50% molar excess, e.g. about 10–50% molar excess, based on the myrcene hydrochloride used.

The tertiary alcohol solvent may be composed of a tertiary alkanol containing 4–6 carbon atoms or a mixture of such tertiary alkanols such as tertiary-butanol, dimethyl-ethyl-carbinol, and/or diethyl-methyl-carbinol, and such tertiary alkanol or mixture may contain up to about 30% water.

The reaction is generally carried out at an elevated temperature of at most up to the boiling temperature of the tertiary alkanol solvent used and/or substantially between about 90–100° C., for optimum results.

A significant feature of the present invention is the use of a tertiary alcohol solvent since this leads to the highly selective transesterification of the myrcene hydrochloride to linalyl acetate in amounts up to about 95% or more of the total esters in the esterified reaction mixture, with the remaining more or less 5% being composed of corresponding esters of other isomeric carbinols of the same basic molecular weight (e.g. of $C_{10}H_{18}O$ carbinols such as geraniol, nerol and terpineol). Specifically, the yield of mixed esters (e.g. up to about 95% or more linalyl acetate, remainder isomers as aforesaid) may in some cases amount to about 65 to 71% or higher of the reaction mixture products, and thus amount to an ester conversion of about 52 to 66.4% or higher based upon the starting myrcene hydrochloride. In any case, the instant invention leads to the selective transesterification of myrcene hydrochloride to linalyl acetate, with only minor amounts of other isomer esters also being produced, such that upon hydrolysis linalool is formed in a corresponding amount.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for the transesterification of myrcene hydrochloride to produce linalyl acetate which comprises reacting myrcene hydrochloride with at least an equimolar amount of sodium acetate in a tertiary alcohol solvent composed of a tertiary alkanol containing 4–6 carbon atoms at an elevated temperature corresponding to the boiling temperature of the solvent used or at a temperature substantially between about 90–100° C., and recovering the linalyl acetate from the resulting reaction mixture.

2. Process according to claim 1 wherein said reacting is carried out at an alkaline pH.

3. Process according to claim 1 wherein a molar excess of sodium acetate is used.

4. Process according to claim 1 wherein said tertiary alcohol solvent contains up to about 30% water.

5. Process according to claim 1 wherein said tertiary alkanol is selected from the group consisting of tertiary butanol, diethylmethyl carbinol, and mixtures thereof.

6. Process according to claim 1 wherein said reacting is carried out in the presence of an alkaline earth metal carbonate.

7. Process according to claim 6 wherein said carbonate is selected from the group consisting of calcium carbonate and magnesium carbonate.

8. Process according to claim 1 wherein said reacting is carried out in the presence of a catalyst selected from the group consisting of cuprous salts and cupric salts.

9. Process according to claim 1 for the transesterification of myrcene hydrochloride to produce linalyl acetate which comprises reacting myrcene hydrochloride with at least an equimolar amount of sodium acetate in a tertiary alcohol solvent selected from the group consisting of a tertiary alkanol containing 4 to 6 carbon atoms, a mixture of tertiary alkanols containing 4–6 carbon atoms, a tertiary alkanol containing 4–6 carbon atoms admixed with up to about 30% water, and a mixture of tertiary alkanols containing 4–6 carbon atoms admixed with up to about 30% water, at the boiling temperature of the solvent used and in the presence of an alkaline earth metal carbonate and a catalyst selected from the group consisting of cuprous salts and cupric salts.

10. Process according to claim 1 for the transesterification of myrcene hydrochloride to produce linalyl acetate which comprises reacting myrcene hydrochloride with at least an equimolar amount of sodium acetate in a tertiary alcohol solvent selected from the group consisting of a tertiary alkanol containing 4 to 6 carbon atoms, a mixture of tertiary alkanols containing 4–6 carbon atoms, a tertiary alkanol containing 4–6 carbon atoms admixed with up to about 30% water, and a mixture of tertiary alkanols containing 4–6 carbon atoms admixed with up to about 30% water, at a temperature substantially between about 90–100° C., and in the presence of an alkaline earth metal carbonate and a catalyst selected from the group consisting of cuprous salts and cupric salts.

References Cited

UNITED STATES PATENTS

| | | | |
|---|---|---|---|
| 2,794,826 | 6/1957 | Bell et al. | 260—489 |
| 3,076,839 | 2/1963 | Webb | 260—489 |

LORRAINE A. WEINBERGER, Primary Examiner

V. GARNER, Assistant Examiner

U.S. Cl. X.R.

260—491, 631.5